3,138,540
MANUFACTURE OF GLUTAMIC ACID BY FERMENTATION

Hiroshi Okada, Tokyo, Koichi Takinami, Kawasaki-shi, Kanagawa-ken, Yoshio Hirose, Oota-ku, Tokyo, Toshinao Tsunoda, Zushi-shi, Kanagawa-ken, and Kageaki Kono, Oota-ku, Tokyo, Japan, assignors to Ajinomoto Co., Inc., and Sanraku Distillers Co., Inc., Tokyo, Japan, both corporations of Japan
No Drawing. Filed Aug. 21, 1962, Ser. No. 218,433
Claims priority, application Japan Aug. 29, 1961
7 Claims. (Cl. 195—47)

This invention relates to the manufacture of glutamic acid by fermentation, and more particularly to a carbon source for the fermentative preparation of glutamic acid.

Many microorganisms are known to be capable of producing glutamic acid from suitable carbon and nitrogen sources by fermentation. In typical industrially employed fermentation processes, glucose is the carbon source. The nitrogen source may be any one or a mixture of ammonia, ammonium sulfate, ammonium nitrate, or urea. The glutamic acid is produced when a wide variety of microorganisms is cultured aerobically at a temperature between about 27° C. and 33° C. on a nutritive medium containing such carbon and nitrogen sources together with certain well-known minor constituents beneficial for the metabolism of the microorganisms.

Glucose is a relatively costly source of carbon, and the primary object of this invention is the provision of a less costly carbon source for media on which glutamic acid producing microorganisms can be cultured.

Cane molasses and sugar beet molasses are available abundantly at low cost. The commercial molasses contains about 50% sucrose. Attempts have previously been made to employ molasses as a carbon source for the fermentative production of glutamic acid. These attempts have failed to result in practical industrial processes for two primary reasons. Molasses contains colored substances which inhibit the fermentative production of glutamic acid by all normally employed microorganisms. Molasses further contains substantial amounts of biotin and of other substances which promote the growth of the microorganisms at the expense of their glutamic acid production. Therefore, in spite of its low cost, molasses has not heretofore been an economical carbon source for glutamic acid fermentation.

We have found that both obstacles to successful fermentation of molasses can be largely removed by subjecting the molasses to a mild oxidation treatment. Suitable oxidizing agents include hydrogen peroxide and other compounds having a peroxide bond, such as the physiologically tolerated salts of persulfuric acid. Glutamic acid can be produced in high yields and high concentrations in culture media which contain the oxidized molasses of our invention as a carbon source.

Treatment of molasses with peroxides such as hydrogen peroxide or an alkali metal persulfate, decomposes the colored substances which impede glutamic acid formation and sufficiently reduces the concentration of growth promoting substances, such as biotin, to favor glutamic acid formation over proliferation of the microorganisms. Yet, the mild oxidants of the invention do not react with the sucrose present to a significant extent.

The following table lists the results of experiments in which samples of beet molasses diluted to a sucrose content of 17.6 g./dl. (deciliter) with approximately two volumes of water were mixed with varying amounts of hydrogen peroxide and left to stand at room temperature (15 to 25° C.) for 40 hours. The first column of the table lists the initial hydrogen peroxide concentration in percent. The second column indicates the amount of colored substances present after 40 hours, as expressed by the light absorbency of the molasses solution at a wavelength of 420 millimicrons determined by a spectro-photometer. The third column lists the sucrose concentration after 40 hours, as determined after inversion by the method of Fehling-Lehmann-Schoorl.

TABLE I

| Hydrogen Peroxide Concentration, Percent | Absorbancy at 420 | Sucrose Concentration, g./dl. |
|---|---|---|
| 0.00 | 2.01 | 17.7 |
| 0.05 | 1.08 | 17.7 |
| 0.10 | 0.75 | 17.3 |
| 0.25 | 0.55 | 17.9 |
| 0.50 | 0.24 | 17.5 |
| 1.00 | 0.18 | 17.4 |
| 2.50 | 0.12 | 17.5 |

The effect of the hydrogen peroxide treatment of molasses on the growth of glutamic acid producing microorganisms is illustrated in Table II which lists results of tests performed on microorganisms grown on media containing molasses treated with varying amounts of hydrogen peroxide. In all tests, a culture medium was prepared from molasses which had been diluted to an initial sucrose concentration of 10 g./dl. and mixed with 0.1 g./dl. potassium dihydrogen phosphate, 0.04 g./dl. magnesium sulfate heptahydrate and 0.8 g./dl. urea. The microorganism employed was *Brevibacterium lactofermentum*, strain No. 2256 (ATCC No. 13869). After incubation for 24 hours, the bacterial growth was determined by measuring turbidity of the culture at a wavelength of 562 millimicrons.

TABLE II

| Hydrogen peroxide concentration, percent: | Turbidity of culture |
|---|---|
| 0.00 | 1.24 |
| 0.10 | 0.98 |
| 0.25 | 0.95 |
| 0.50 | 0.82 |
| 1.00 | 0.78 |

The reduction in the amount of the colored inhibitors of acid production and in the amount of growth promoting substances increases the yield of glutamic acid, as is evidenced by Table III which shows the microorganism growth and glutamic acid production of culture media containing two concentrations of sugar in the form of peroxide treated and untreated molasses. The treated molasses was obtained by mixing molsasses diluted to 5.0 and 10.0 g./dl. sucrose with an initial dose of 0.5 percent hydrogen peroxide, and leaving the mixture to stand for 46 hours at ambient temperature. In addition to molasses, each culture medium contained 0.1 g./dl. potassium dihydrogen phosphate, 0.04 g./dl. magnesium sulfate heptahydrate and 0.8 g./dl. urea as a source of nitrogen. The medium was subdivided into batches of 20 ml. which were sterilized in individual flasks and inoculated with *Brevibacterium lactofermentum* strain No. 2256 (ATCC No. 13869). The fermentation proceeded for 48 hours at 30° C. under shaking.

TABLE III

| Sucrose Concentration in Culture Medium, g./dl. | Glutamic Acid Yield, Percent | | Turbidity of Cult. | |
|---|---|---|---|---|
| | Untreated Molasses | Treated | Untreated Mol. | Treated |
| 5.0 | 13.7 | 42.4 | 1.08 | 0.79 |
| 10.0 | 8.3 | 25.6 | 1.22 | 0.77 |

Since molasses treated with hydrogen peroxide contains only reduced amounts of colored glutamic acid formation inhibitors and of microorganism growth promotors, so treated molasses may be added to a culture medium during the course of fermentation without undesirable effects on the production of glutamic acid, which is obtained at a high yield and in relatively high concentration. We have also found that the small amount of growth promoting agents left after the oxidation treatment is unable to promote microorganism growth when added to the culture medium in a stage when normal growth of microorganisms has been completed.

This fact is illustrated by Table IV which shows the growth of cultures of *Brevibacterium lactofermentum* strain No. 2256 (ATCC No. 13869), as expressed by the turbidity of the culture medium which originally contained 6 micrograms biotin per liter. Admixture of additional 6 micrograms of biotin affects the growth of the microorganisms only if made less than 24 hours after first inoculation. The results of comparison tests made without admixture of additional biotin and with initial biotin contents of 6 and 12 micrograms per liter respectively are included. The culture medium in each test included 10 g./dl. glucose, 0.1 g./dl. potassium dihydrogen phosphate, 0.04 g./dl. magnesium sulfate heptahydrate, 2 p.p.m. each of ferrous ion and manganese ion, and 0.8 g./dl. urea. The cultures were shaken at 30° C.

TABLE IV

| Initial Biotin Microgram per liter | Biotin Added | | Turbidity of Culture After Hours | | | | | Glutamic Acid Concentration After 48 Hours, g./dl. |
|---|---|---|---|---|---|---|---|---|
| | Micrograms | After Hours | 12 | 18 | 24 | 30 | 36 | |
| 6 | 0 | ------ | 0.42 | 0.57 | 0.61 | 0.62 | 0.62 | 4.53 |
| 6 | 6 | 6 | 0.59 | 0.83 | 0.88 | 0.88 | 0.89 | 1.74 |
| 6 | 6 | 12 | 0.42 | 0.70 | 0.83 | 0.85 | 0.84 | 2.20 |
| 6 | 6 | 18 | ------ | 0.57 | 0.77 | 0.80 | 0.79 | 3.95 |
| 6 | 6 | 24 | ------ | ------ | 0.61 | 0.61 | 0.62 | 4.47 |
| 6 | 6 | 30 | ------ | ------ | ------ | 0.62 | 0.60 | 4.47 |
| 12 | 0 | ------ | 0.61 | 0.81 | 0.89 | 0.90 | 0.91 | 1.67 |

Addition of large amounts of biotin, however, brought about an increased growth of bacteria, regardless of the time of addition, and decreased the yield of L-glutamic acid.

Since mildly oxidized molasses does not interfere with glutamic acid production when added to a culture after fermentation of a portion of the original sucrose content, we have been able to obtain glutamic acid in the fermentation broth in higher concentrations than has been possible heretofore under otherwise comparable conditions. This is evidenced by the data listed in Table V.

In the four runs the results of which are listed in Table V, three batches of culture medium had approximately the same sucrose content, a fourth one initially contained approximately twice the amount of sucrose. All batches were made up from molasses treated with 1% hydrogen peroxide for 48 hours and with the inorganic constituents described in Example 3. 20 ml. of each culture medium were placed in a 500 ml. flask and inoculated with the afore-mentioned *Brevibacterium lactofermentum*. 18 hours, after the inoculation, 15 g./dl. molasses were added in several small portions to two of the cultures having initially lower sucrose content to bring the total sucrose fed to the culture to approximately the initial amount of the fourth batch. The molasses in one of the additions was untreated, the other treated with 1% hydrogen peroxide as the originally employed molasses. 48 hours after inoculation, the fermentation was completed and the concentration and yield of glutamic acid were determined.

Table V shows that an excessive initial concentration of sucrose reduces the yield without materially increasing the concentration. It is further evident that addition of untreated molasses during fermentation unfavorably affects yield and concentration. Addition of treated molasses during an advanced stage of cultivation increases the concentration of glutamic acid formed approximately in proportion to the total amount of sucrose employed so that the percentage yield is not affected.

TABLE V

| Initial Sucrose Concentr. g./dl. | Molasses Added | Total Sucrose Added g./dl. | Final Turbidity | Final Concentr. of Glutamic Acid, g./dl. | Yield of Glutamic Acid, Percent |
|---|---|---|---|---|---|
| 4.97 | ------ | ------ | 0.76 | 2.13 | 42.8 |
| 10.12 | ------ | ------ | 0.89 | 2.49 | 24.6 |
| 4.73 | (1) | 9.88 | 0.80 | 4.06 | 41.2 |
| 4.73 | (2) | 9.84 | 1.27 | 1.45 | 14.7 |

[1] Treated molasses.
[2] Untreated molasses.

The following detailed examples further illustrate the fermentative manufacture of L-glutamic acid with the use of mildly oxidized molasses as a carbon source. It will be understood that the invention is not limited by these examples.

*Example I*

Molasses containing 66.4 g./dl. sucrose was diluted with water to approximately three times its initial volume. 31% aqueous hydrogen peroxide was added to the diluted molasses to a concentration of 0.75% $H_2O_2$. The reaction mixture was stirred intermittently at room temperature for two days. One percent diatomaceous earth by weight was added to the reaction mixture which was then filtered. The filtrate was further diluted with water to a sucrose concentration equivalent after inversion to a combined content of 5 g./dl. sucrose and fructose. A culture medium was prepared from the molasses by the addition of 0.1 g./dl. potassium dihydrogen phosphate, 0.04 g./dl. magnesium sulfate heptahydrate, 0.001 g./dl. ferrous sulfate, and 0.8 g./dl. urea. The pH of the medium was adjusted to 7.0 with one-normal sodium hydroxide solution.

20 ml. batches of the culture medium were placed in flasks, sterilized at 120° C. for 15 minutes, and inoculated with *Brevibacterium lactofermentum*, strain No. 2256 (ATCC No. 13869), which had previously been cultured on a bouillon agar slant medium for 24 hours. The fermentation was permitted to proceed at 31° C. for 38 hours under shaking. 0.4 ml. of a 45% aqueous solution of urea were added to each flask during fermentation to keep the culture medium slightly alkaline. The medium after fermentation contained 2.26 g./dl. L-glutamic acid.

The culture broth obtained after fermentation was evaporated to a syrupy consistency, and its pH was adjusted to the isoelectric point of glutamic acid (3.2) by means of hydrochloric acid. When the concentrated broth was kept over-night in an ice box, 17.3 g. of crystallized crude L-glutamic acid were obtained from each liter of the original broth.

Example II 500 ml. cane molasses containing 48 g./dl. sucrose was diluted with 1150 ml. water to a concentration of 15 g./dl. sucrose. 25 ml. of an aqueous 31% hydrogen peroxide solution were added. The mixture obtained was stirred vigorously and kept at room temperature for 42 hours. 20 grams diatomaceous earth was admixed with stirring, and then again removed by filtration. The filtrate was diluted to a sucrose concentration of 5 g./dl.

Twenty milliliters of the diluted molasses were placed in a shaking flask together with 0.1 g./dl. potassium dihydrogen phosphate, 0.04 g./dl. magnesium sulfate heptahydrate, 0.001 g./dl. ferrous sulfate, 0.001 g./dl. manganous suufate, and 0.8 g./dl. urea. The culture medium was sterilized in the flask and inoculated with the afore-mentioned strain of *Brevibacterium lactofermentum*. After 20 hours' fermentation under shaking at 30° C., 20 ml. of the original treated molasses of 15 g./dl. sucrose were added to the culture medium, and fermentation was continued for 25 hours. Aqueous urea solution was added at a rate sufficient to keep the culture medium slightly alkaline. The amount of L-glutamic acid in the fermentation broth finally reached 4.06 g./dl.

Example III

An aqueous solution of sugar beet molasses was prepared by diluting 6.7 liters of crude molasses containing about 60 g./dl. sucrose with 20 liters of water. 300 ml. of 31% hydrogen peroxide were admixed to the solution. The mixture was stirred vigorously, and then left to stand without agitation at room temperature for two days. 21.6 grams diatomaceous earth were stirred into the reaction mixture, which was thereafter filtered with suction.

A culture medium was prepared from 6.7 liters of the filtrate, 20 grams potassium dihydrogen phosphate, 8 grams magnesium sulfate heptahydrate, 0.2 gram each of ferrous sulfate and manganous sulfate, and 60 grams urea. The pH of the medium was adjusted to 5.0. The medium was diluted to 20 liters and placed in a 60 liter stainless steel fermentation jar. The medium in the jar was sterilized at 120° C. for 15 minutes, cooled quickly, and inoculated with 400 ml. of a seed liquor of the afore-mentioned strain of *Brevibacterium lactofermentum* which had been cultured 24 hours. Fermentation was carried out in the jar at 30° C. with aeration and agitation.

After the fermentation had proceeded for 18 hours 20 liters of the previously prepared filtrate were sterilized and then added to the fermentation broth in the jar in several batches while fermentation was continued. Throughout the fermentation period, the pH of the culture medium was held at 7.7 by the addition of ammonia to the air being passed through the culture. 33 hours after inoculation, fermentation was completed. The concentration of L-glutamic acid in the fermentation broth was 4.47 grams per deciliter.

The broth was filtered after addition of 1.5 percent of diatomaceous earth to remove the bacterial cells. The filtrate was decolorized by the addition of 0.3 percent activated carbon and filtration and finally evaporated in vacuo at 70 to 75° C. to a syrupy consistency.

When the residue was acidified to pH 3.2 with 10 percent hydrochloric acid and cooled overnight, 1.42 kilograms L-glutamic acid was precipitated and recovered by filtration.

Example IV

Sugar beet molasses was diluted with two volumes of water, and ammonium persulfate was added in an amount sufficient to make the ammonium persulfate concentration in the diluted molasses 3 percent. After 18 hours standing at room temperature, the molasses solution was purified by the addition of 1 percent diatomaceous earth and filtration.

20 milliliter batches of a culture medium were prepared from the treated molasses solution and contained

|   | G./dl. |
|---|---|
| Sugar (glucose equivalent) | 5 |
| KH$_2$PO$_4$ | 0.1 |
| MgSO$_4$.7H$_2$O | 0.04 |
| Urea | 0.8 |

The hydrogen ion concentration of the medium was adjusted to pH 7.0 by the addition of sodium hydroxide solution, and the medium was sterilized at 120° for 15 minutes. It was then inoculated with the afore-mentioned strain of *Brevibacterium lactofermentum* and cultured 48 hours at 30° C. with shaking. The pH was kept barely akaline by addition of a 45% solution of urea.

After fermentation, the culture contained 2.66 grams L-glutamic acid per deciliter. The liquid portion of the culture was decanted from the solids which included most of the microorganisms, clarified by centrifuging, acidified to pH 3.2, and permitted to crystallize. The L-glutamic acid crystals recovered weighted 0.402 gram.

Example V

A culture medium was prepared in the manner described in Example IV to contain 10 grams sugar per 100 milliliters, and was inoculated with *Brevibacterium lactofermentus* strain No. 2256.

Fermentation was carried out as in Example IV. The concentration of L-glutamic acid in the fermented medium was 3.21 grams per 100 milliliters.

Example VI

A culture meduim was prepared in the manner described in Example IV, and was inoculated with *Brevibacterium flavum* strain No. 2247 ATCC No. 14067. The medium was cultured as described in Example IV.

The L-glutamic acid produced amounted to 2.03 grams per 100 milliliters.

Example VII

Sugar beet molasses was diluted with two volumes of water and 4% potassium persulfate was added. The mixture was left to stand for 18 hours at room temperature.

A culture medium was prepared from the treated molasses solution in the manner described in Example IV.

The culture medium was inoculated with *Brevibacterium roseum* strain No. 7 ATCC No. 13825 and fermented as described in Example IV. The meduim was kept alkaline by gradual addition of 0.5 ml. of a 45% urea solution.

The fermentation mixture contained 2.28 grams L-glutamic acid per 100 milliliters.

Example VIII

A diluted, midly oxidized solution of sugar beet molasses was prepared in the manner described in Example IV. A culture medium was prepared therefrom to contain

|   | G./dl. |
|---|---|
| Sucrose | 10 |
| KH$_2$PO$_4$ | 0.1 |
| MgSO$_4$.7H$_2$O | 0.04 |
| Urea | 0.3 |
| pH | 5.0 |

14 liters of the medium were sterilized in a 20 liter stainless steel fermentation jar for 15 minutes at 120° C., and inoculated with the aforementioned strain of *Brevibacterium lactofermentum*. The culture was kept at 30° C. for 36 hours under shaking. Its pH was held at 7.7 by admixture of gaseous ammonia to the air that was being passed through it.

After fermentation was completed, 3.51 grams per deciliter of L-glutamic acid were found in the broth. Diatomaceous earth was added, the liquid portion of the culture medium was separated from the solids, and was decolorized by the addition of 0.3 percent activated charcoal and filtration. The filtrate was concentrated in vacuo at 75° C., acidified to pH 3.2, and permitted to stand in an ice box overnight for crystallization of the glutamic acid. The crystals of crude L-glutamic acid recovered weighed 380 grams.

While the effects of specific peroxides have been described in the preceding examples, other peroxides employed in equivalent amounts have substantially identical results. Such peroxides include the physiologically tolerated metal peroxides such as the peroxides of the alkali metals and more specifically sodium and potassium peroxide, and organic peroxides such as per acetic acid. The persulfates of other physiologically tolerated metals may replace ammonium or potassium persulfate in the several examples without affecting the results obtained since the cation associated with the persulfate ions has no significant influence on the oxidizing effect.

It will be understood therefore that the invention is not limited to the specific embodiments described, but is to be construed broadly and restricted solely by the scope of the appended claims.

What is claimed is:

1. In a method of providing a carbon source for glutamic acid producing microorganisms, the step of reacting molasses containing biotin with an amount of a peroxide sufficient to destroy a portion of said biotin; preparing an aqueous medium containing a nitrogen source and said partially oxidized molasses as a carbon source; culturing on said medium microorganisms capable of converting the sucrose of said molasses in said medium into glutamic acid in the presence of said nitrogen source; and separating the glutamic acid formed from the remainder of said medium.

2. In a method as set forth in claim 1, said peroxide being selected from the group consisting of hydrogen peroxide and a physiologically tolerated salt of persulfuric acid.

3. In a method as set forth in claim 2, said peroxide being an alkali metal salt of persulfuric acid.

4. In a method as set forth in claim 2, said peroxide being ammonium persulfate.

5. In a method of producing glutamic acid, in combination,
   (a) reacting molasses containing biotin with an amount of a peroxide selected from the group consisting of hydrogen peroxide, an alkali metal persulfate, and ammonium persulfate sufficient partially to oxidize the biotin in said molasses;
   (b) preparing an aqueous culture medium containing a nitrogen source and said partially oxidized molasses as a carbon source;
   (c) culturing on said medium microorganisms capable of converting the sucrose of said molasses in said medium into glutamic acid in the presence of said nitrogen source; and
   (d) recovering said glutamic acid from said medium.

6. In a method as set forth in claim 5, the step of heating said molasses after the oxidation of the biotin thereof and prior to said culturing to a temperature above 100° C. for a period sufficient to sterilize said molasses.

7. In a method as set forth in claim 6, said molasses being heated to said temperature in said aqueous culturing medium.

References Cited in the file of this patent

UNITED STATES PATENTS 3,041,250    Wolnak  _____ June 26, 1962

OTHER REFERENCES

Chao and Foster: Journal of Bacteriology 77, 715–725 (1959).